(12) United States Patent
Bae et al.

(10) Patent No.: US 10,918,984 B2
(45) Date of Patent: *Feb. 16, 2021

(54) AIR PURIFIER WITH HINGED FILTER FRAME

(71) Applicant: COWAY CO., LTD., Chungcheongnam-do (KR)

(72) Inventors: Jun-Hyoung Bae, Seoul (KR); Sang-Woo Kang, Seoul (KR); Jin-Min Kim, Seoul (KR)

(73) Assignee: COWAY CO., LTD., Chungcheongnam-do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/029,452

(22) Filed: Sep. 23, 2020

(65) Prior Publication Data

US 2021/0001262 A1    Jan. 7, 2021

Related U.S. Application Data

(63) Continuation of application No. 15/750,876, filed as application No. PCT/KR2016/008690 on Aug. 8, 2016.

(30) Foreign Application Priority Data

Aug. 12, 2015 (KR) .................. 10-2015-0113769
Aug. 31, 2015 (KR) .................. 10-2015-0122534
Oct. 21, 2015 (KR) .................. 10-2015-0146484

(51) Int. Cl.
*B01D 46/12* (2006.01)
*B01D 46/44* (2006.01)
(Continued)

(52) U.S. Cl.
CPC .......... *B01D 46/12* (2013.01); *B01D 46/002* (2013.01); *B01D 46/0005* (2013.01);
(Continued)

(58) Field of Classification Search
CPC .. B01D 46/12; B01D 46/002; B01D 46/0005; B01D 2267/30; B01D 2267/40; B01D 2275/203
See application file for complete search history.

(56) References Cited

U.S. PATENT DOCUMENTS 2,321,802 A    6/1943   Deubener
3,116,004 A   12/1963   Tyrseck et al.
(Continued)

FOREIGN PATENT DOCUMENTS

CN        1740676       3/2006
CN     201030272 Y    3/2008
(Continued)

OTHER PUBLICATIONS

International Search Report for PCT/KR2016/008690 dated Jan. 5, 2017. 4 pages.
(Continued)

*Primary Examiner* — Robert Clemente
(74) *Attorney, Agent, or Firm* — Oblon, McClelland, Maier & Neustadt, L.L.P.

(57) ABSTRACT

The present invention provides an air purifier. The air purifier according to one preferred embodiment, of the present invention may comprise: a housing; a blowing unit installed in the housing so as to draw in external air; and a filter unit having filtering surfaces, through which the air passes and which are disposed in multiple directions, and an air inflow space, which has at least a part thereof surrounded (Continued)

by the filtering surfaces disposed in the multiple directions and into which the air discharged from, the blowing unit flows.

10 Claims, 18 Drawing Sheets

(51) Int. Cl.
  *B01D 46/42* (2006.01)
  *B01D 46/00* (2006.01)
(52) U.S. Cl.
  CPC .......... *B01D 46/009* (2013.01); *B01D 46/42* (2013.01); *B01D 46/44* (2013.01); *B01D 2267/40* (2013.01); *B01D 2273/30* (2013.01); *B01D 2275/203* (2013.01)

(56) References Cited

U.S. PATENT DOCUMENTS

| | | | |
|---|---|---|---|
| 4,027,714 | A | 6/1977 | Dixon et al. |
| 5,711,210 | A | 1/1998 | Kaufman |
| 5,797,975 | A * | 8/1998 | Davis ................. B01D 46/0013 55/483 |
| 6,361,590 | B1 | 3/2002 | Gilbert, Jr. |
| 7,201,116 | B2 | 4/2007 | Axelrod |
| 7,410,520 | B2 | 8/2008 | Nowak et al. |
| 8,974,565 | B2 | 3/2015 | Cecchi |
| 2007/0137489 | A1 | 6/2007 | Luo |
| 2009/0320426 | A1 * | 12/2009 | Braunecker ............ B01D 46/12 55/511 |
| 2012/0067228 | A1 | 3/2012 | Hale |
| 2018/0161716 | A1 | 6/2018 | Li et al. |

FOREIGN PATENT DOCUMENTS

| | | |
|---|---|---|
| CN | 103933790 | 7/2014 |
| CN | 104436911 | 3/2015 |
| CN | 104728954 | 6/2015 |
| CN | 107995876 A | 5/2018 |
| DE | 7039913 | 3/1971 |
| DE | 37 44 270 A1 | 7/1989 |
| DE | 40 04 343 A1 | 8/1991 |
| DE | 198 04 927 A1 | 8/1998 |
| EP | 1275907 B1 | 1/2005 |
| EP | 1 847 309 A1 | 10/2007 |
| EP | 2837897 | 2/2015 |
| FR | 2 572 633 A1 | 5/1986 |
| JP | H6-226024 A | 8/1994 |
| JP | 2000-280737 A | 10/2000 |
| JP | 4201956 | 10/2001 |
| JP | 2001286717 A | 10/2001 |
| JP | 2005-7361 A | 1/2005 |
| JP | 2010-21740 A | 1/2010 |
| JP | 4598319 | 12/2010 |
| JP | 2011177246 | 9/2011 |
| JP | 2012148259 | 8/2012 |
| KR | 0369798 | 12/2004 |
| KR | 20040108462 | 12/2004 |
| KR | 20090035375 | 4/2009 |
| KR | 20090035375 A | 4/2009 |
| KR | 10-2013-0053683 A | 5/2013 |
| KR | 10-20130-0078044 A | 7/2013 |
| KR | 20150005594 | 1/2015 |
| WO | 2017/026761 A1 | 2/2017 |

OTHER PUBLICATIONS

Machine translation for EP1275907B1 Tazawa, Tetsuya (Year: 2019).
Machine Translation for JP-2001286717-A Hagiwara, Shinichi (Year: 2019).
Merriam-Webster definition of chamber (Year: 2019).
The Second Office Action dated Jun. 30. 2020 in corresponding Chinese Patent Application No. 201680047107.9 (with English translation)(22 pages).

* cited by examiner

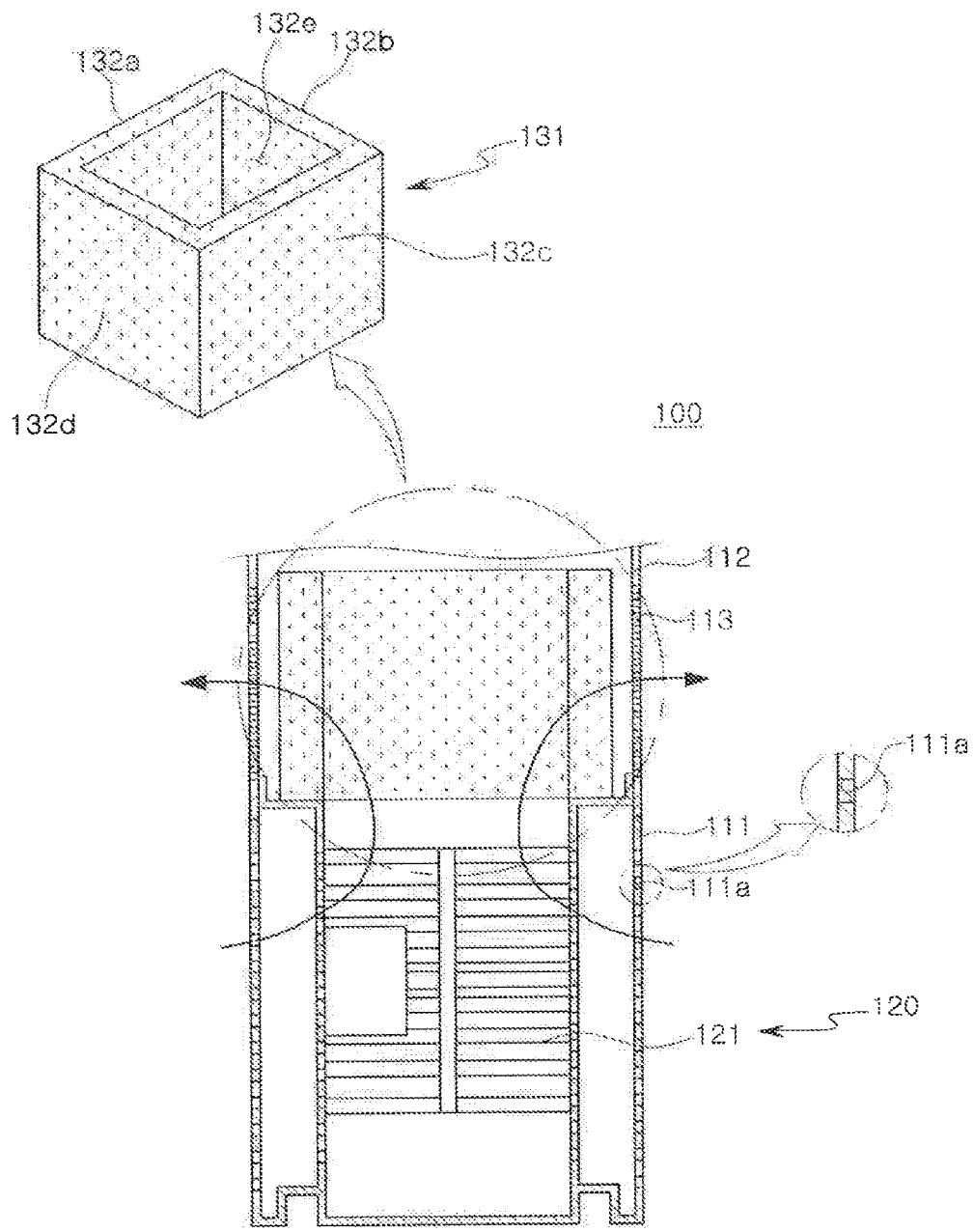
[FIG.1]

[FIG.2]
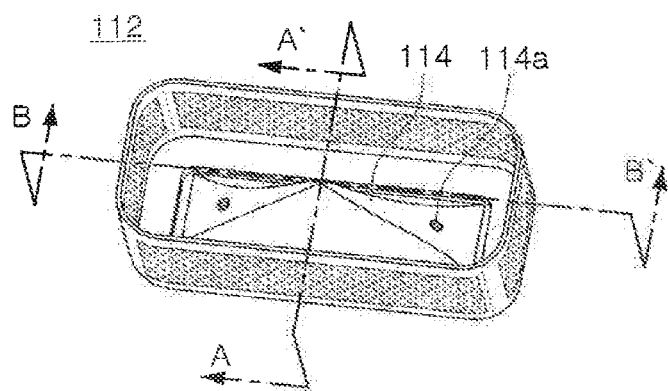
[FIG.3]
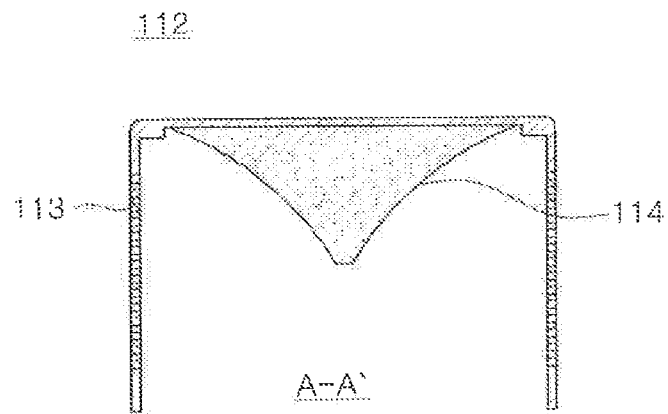

[FIG.4]
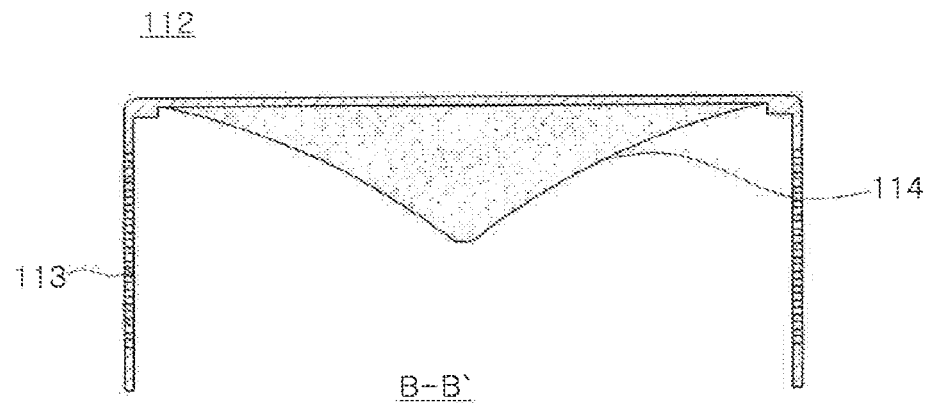
[FIG.5]
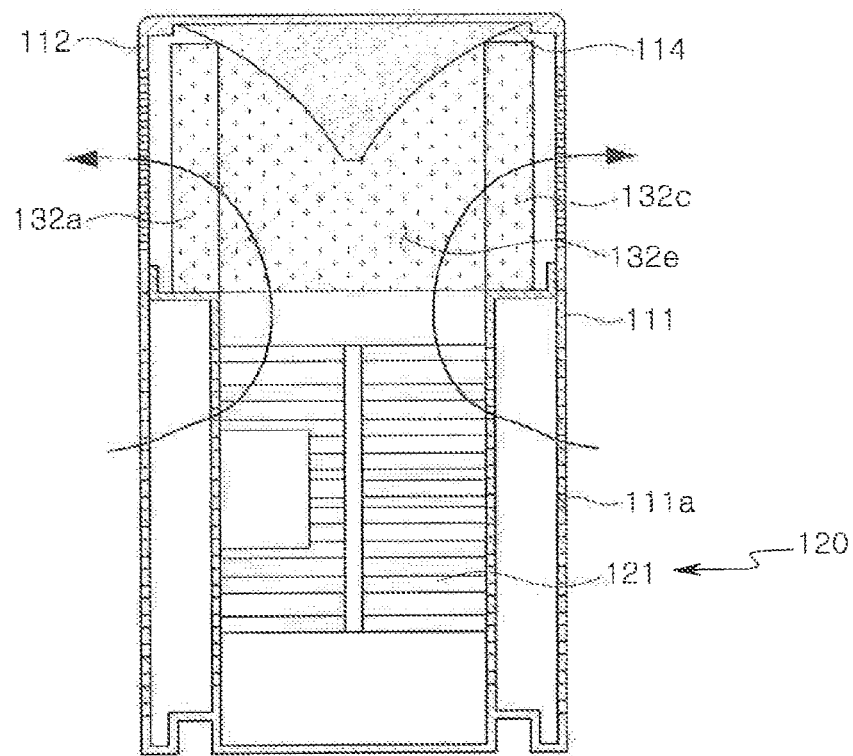

[FIG.6]
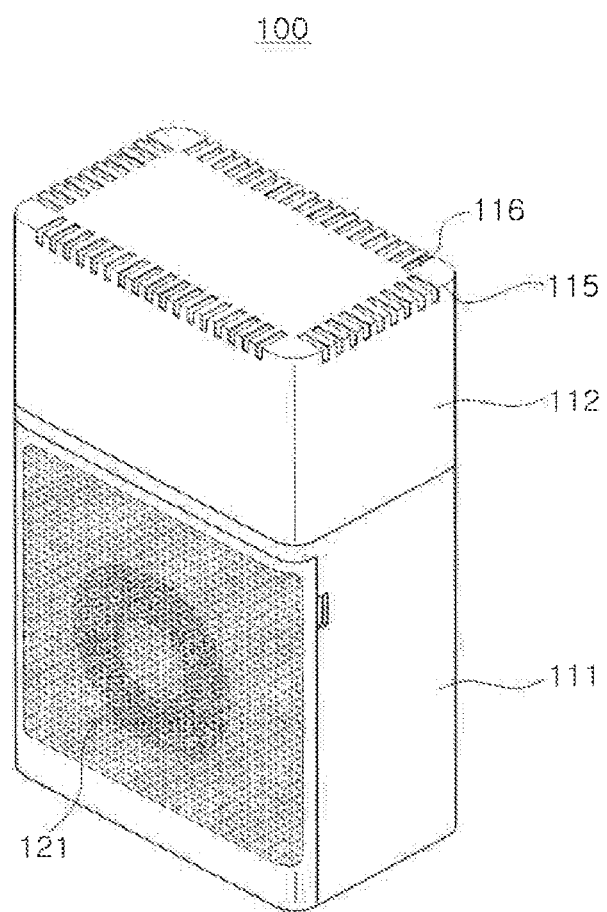

[FIG.7]
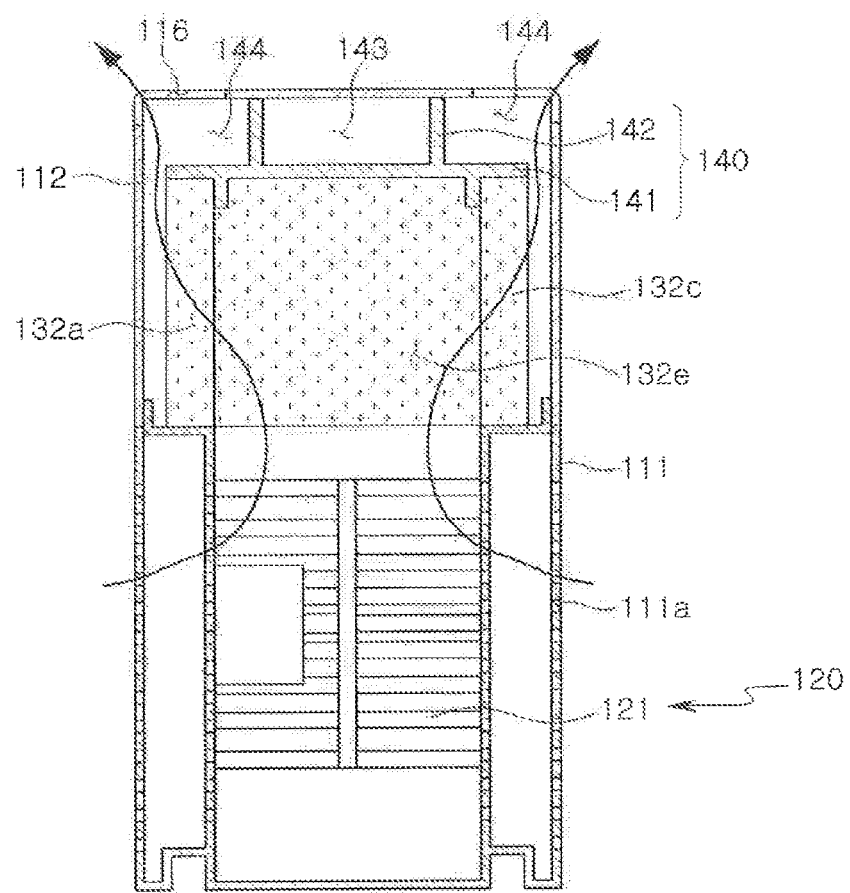

[FIG.8]
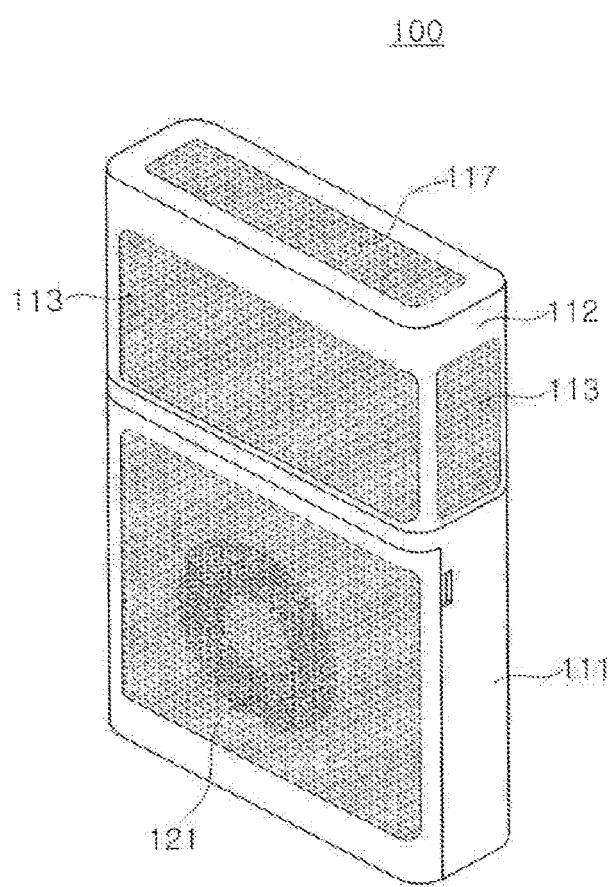

[FIG. 9]
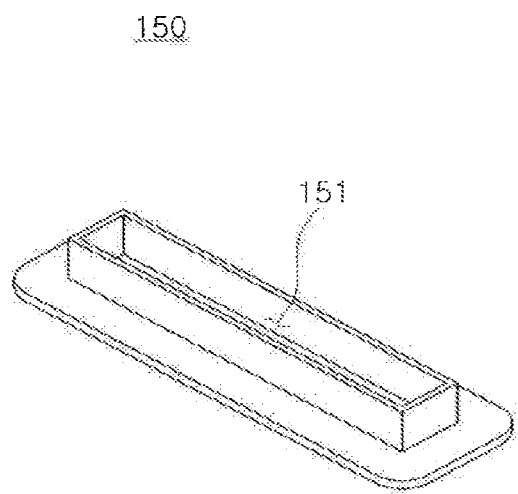

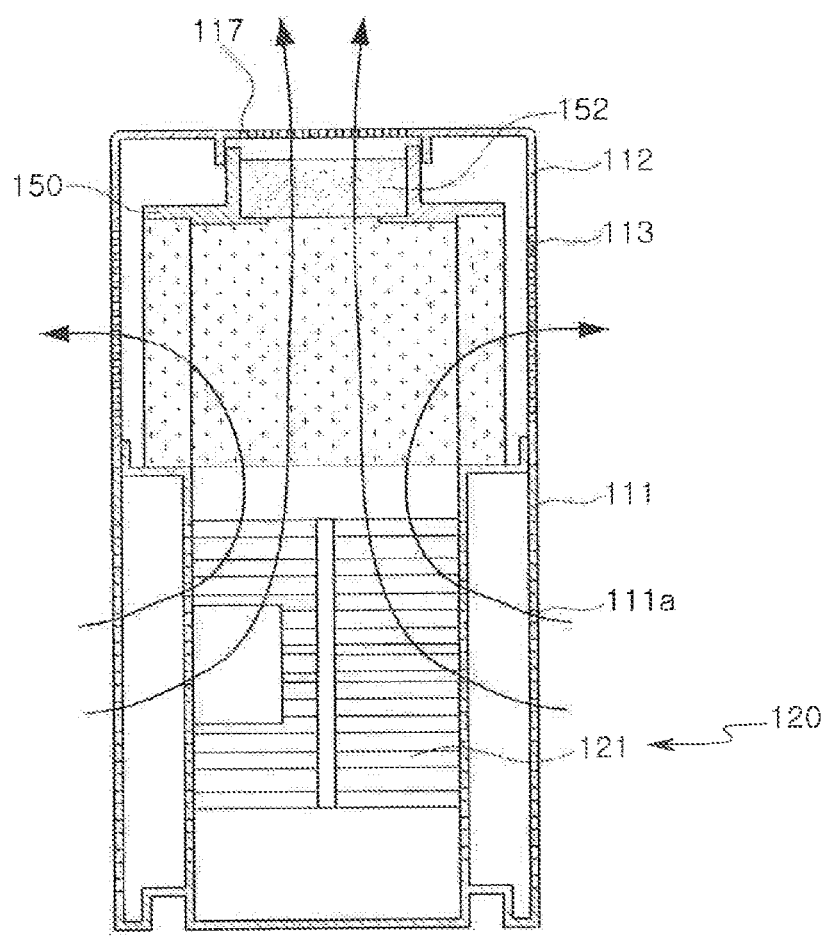
[FIG.10]

[FIG.11]
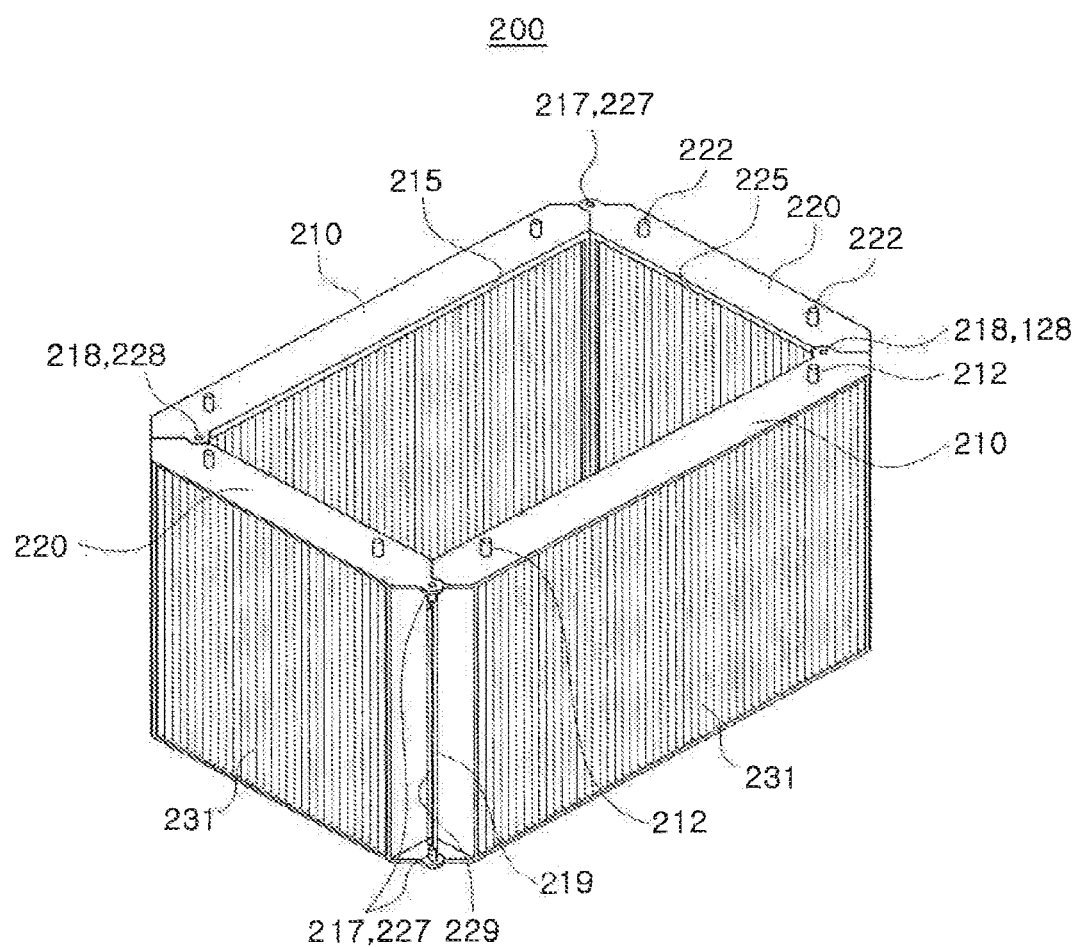

[FIG.12]
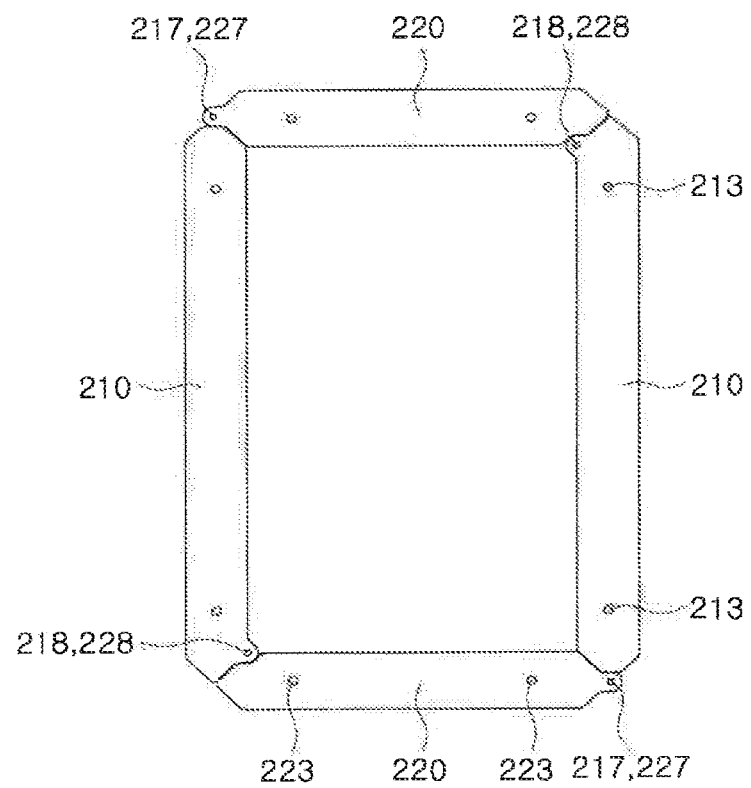

[FIG.13]
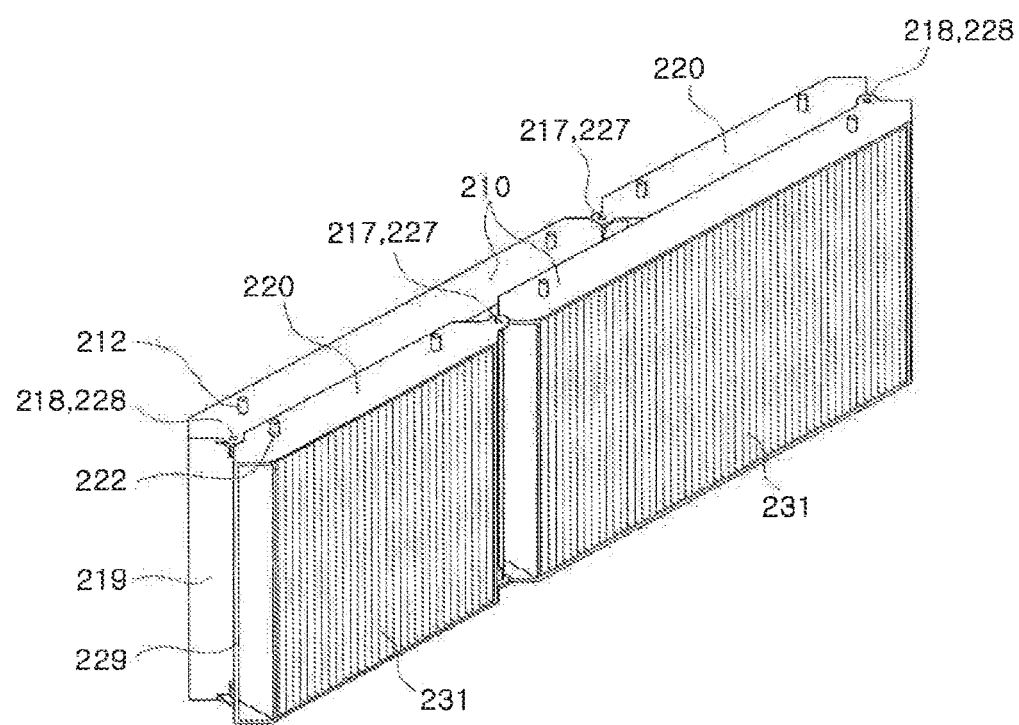

[FIG.14]
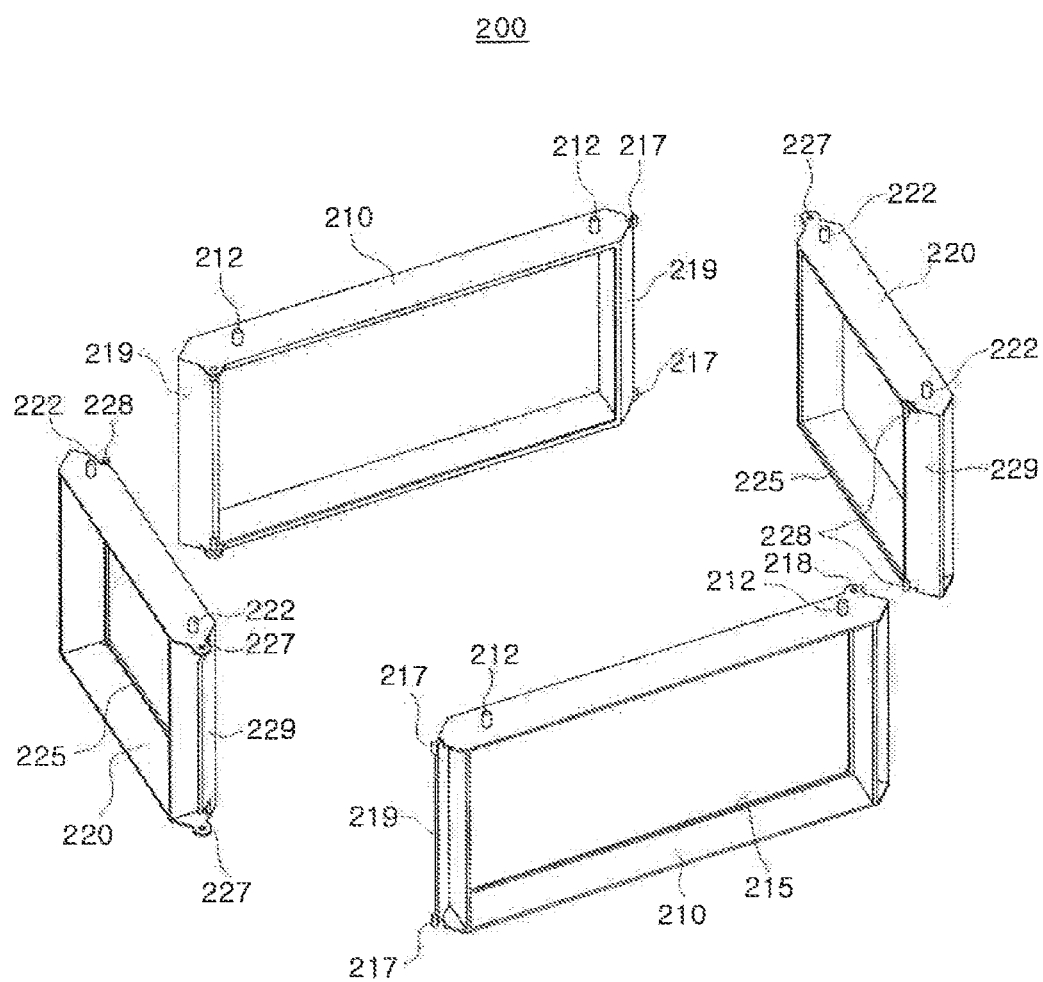

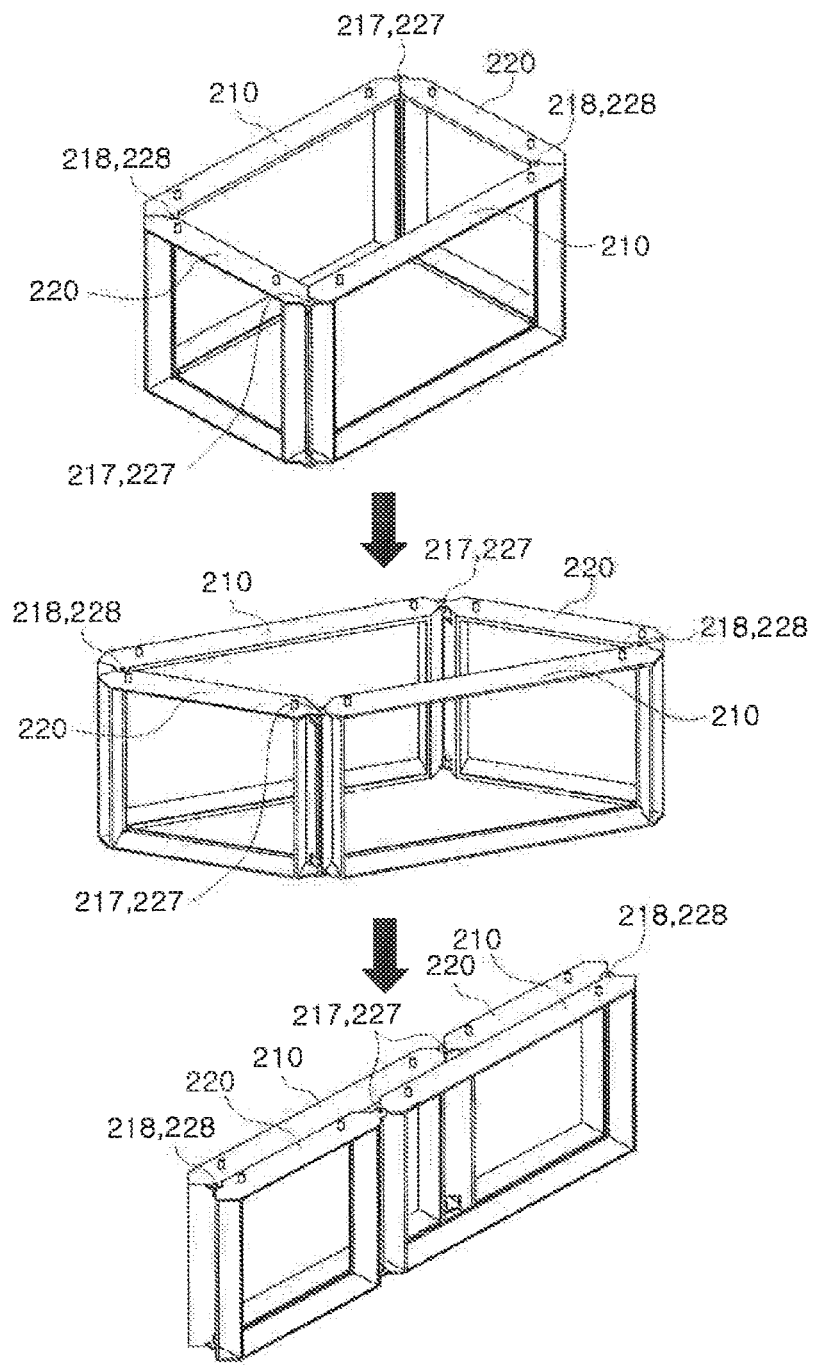
[FIG.15]

[FIG.16]
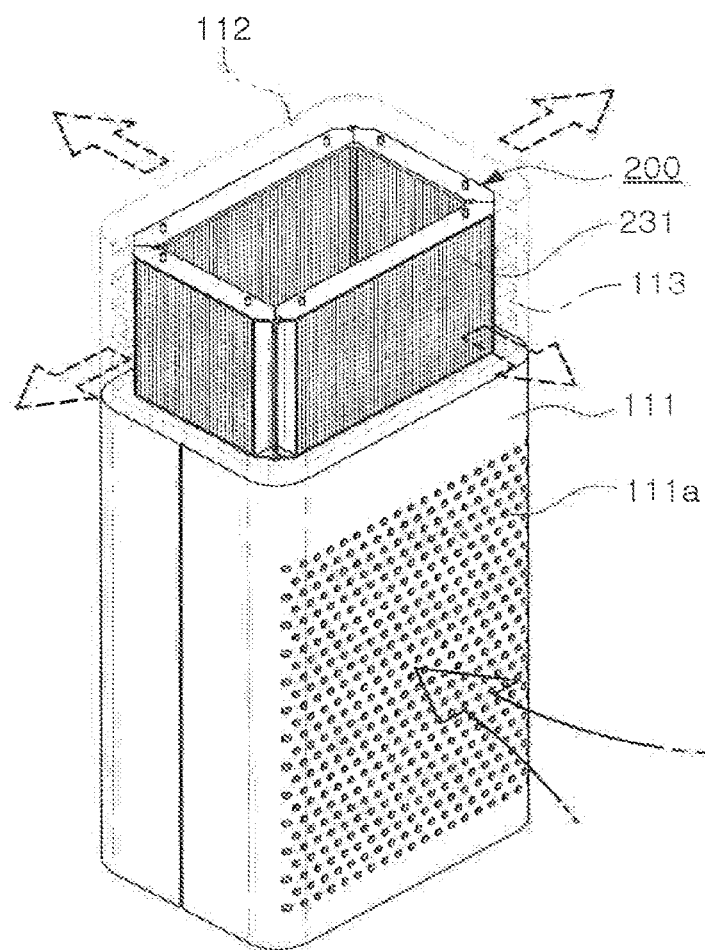

[FIG.17]
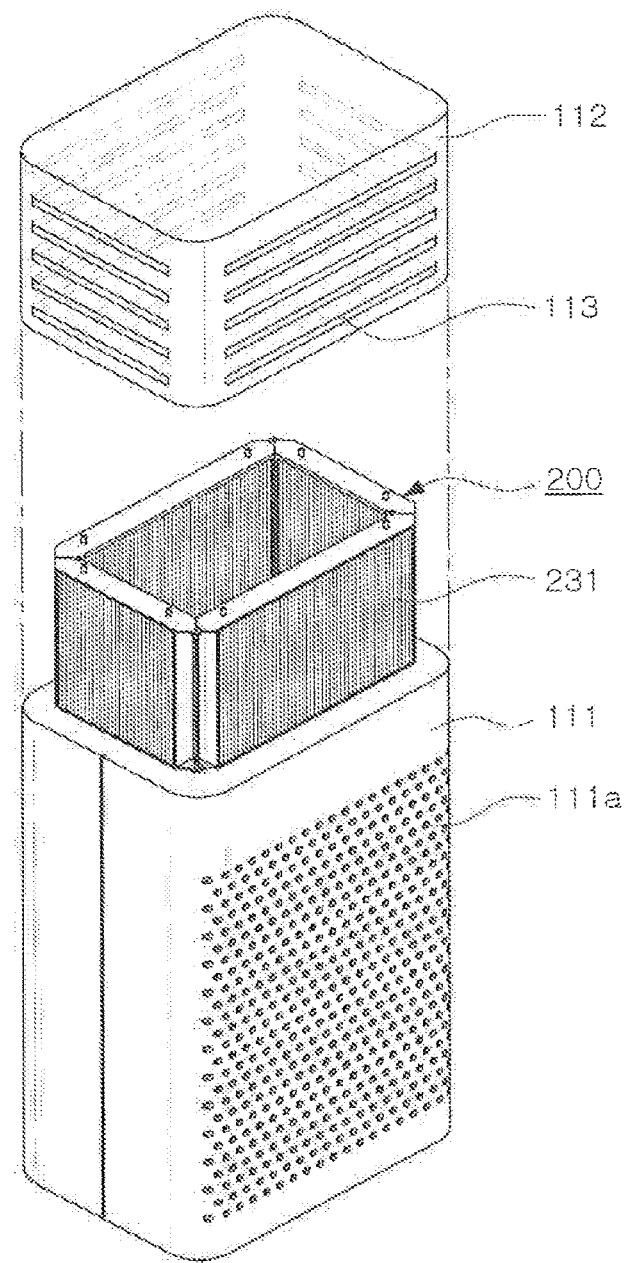

[FIG.18]
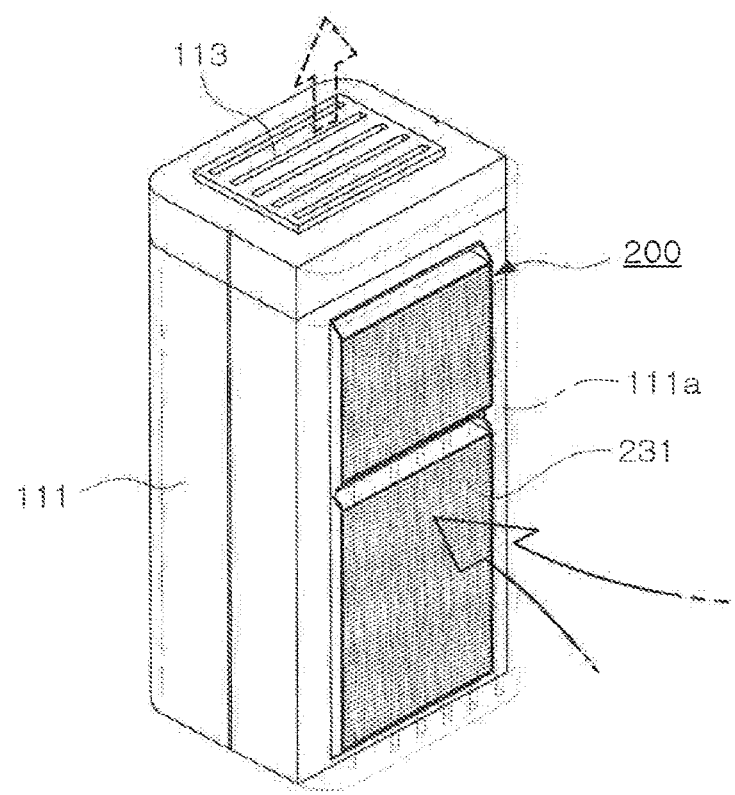

[FIG.19]
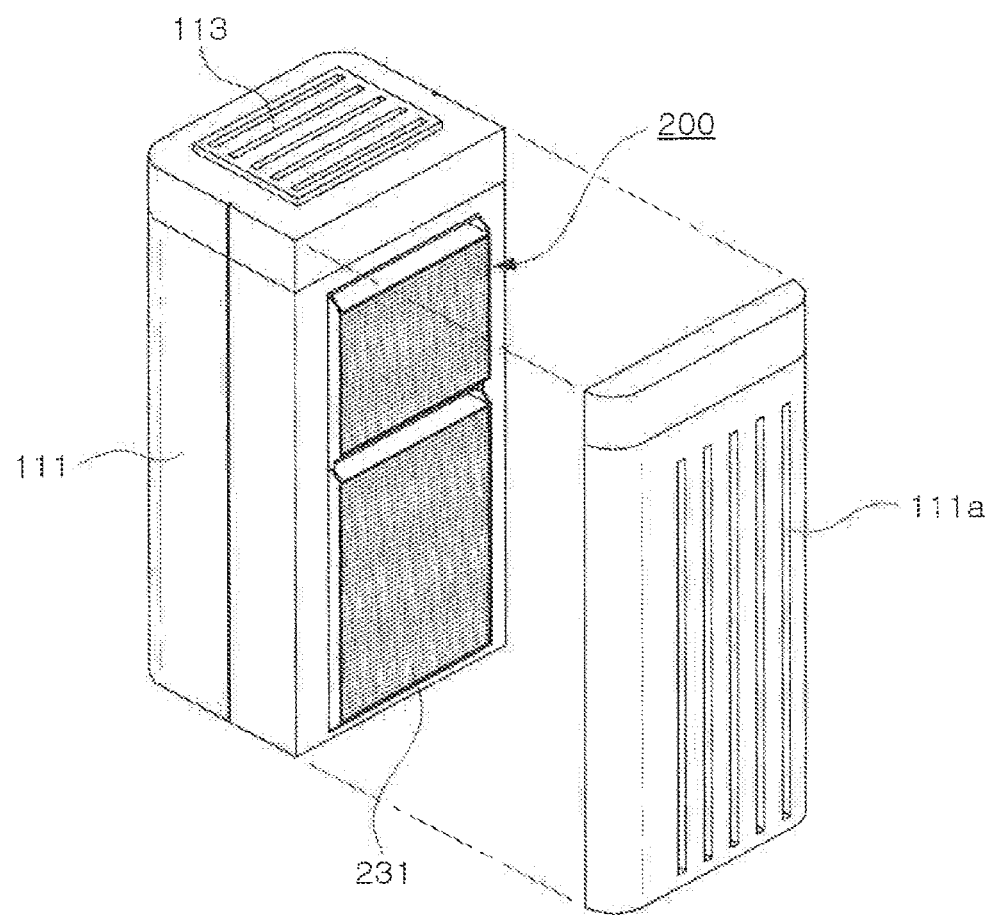

[FIG.20]
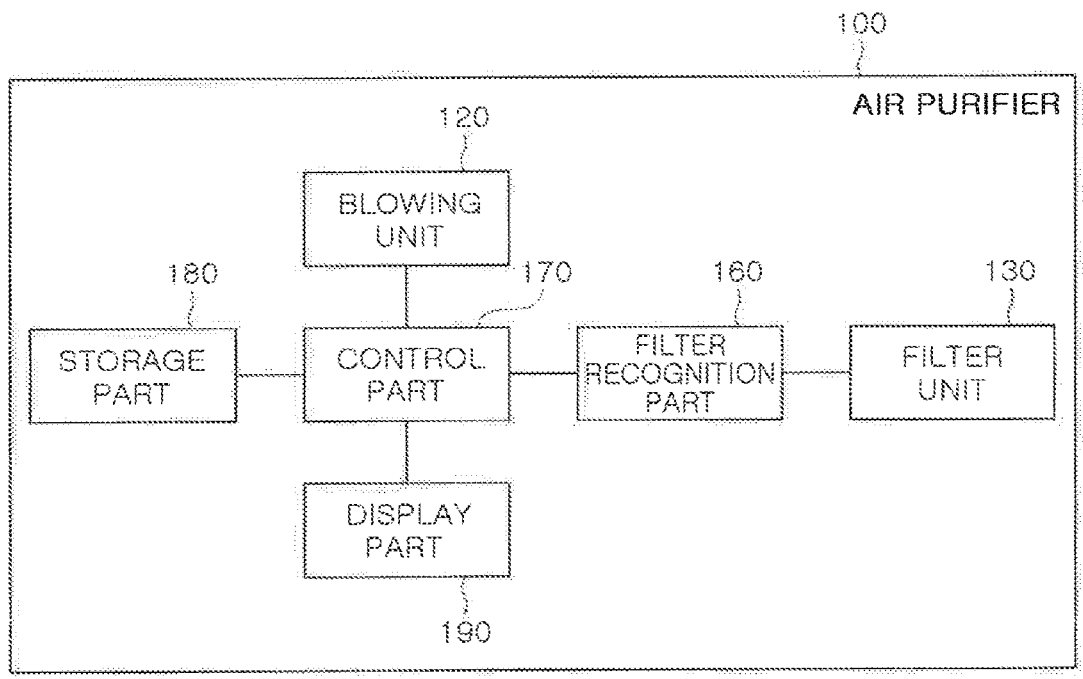

AIR PURIFIER WITH HINGED FILTER FRAME

CROSS REFERENCE TO RELATED APPLICATIONS

This application is a continuation of U.S. patent application Ser. No. 15/750,876, filed Feb. 7, 2018, which is incorporated by reference herein and is the U.S. National Stage entry of International Application Number PCT/KR2016/008690, filed under the Patent Cooperation Treaty having a filing date of Aug. 8, 2016, which claims priority to Korean Patent Application Serial Number 10-2015-0113769 having a filing date of Aug. 12, 2015, Korean Patent Application Serial Number 10-2015-0122534 having a filing date of Aug. 31, 2015, and Korean Patent Application Serial Number 10-2015-0146484 having a filing date of Oct. 21, 2015.

TECHNICAL FIELD

The present disclosure relates to an air purifier, capable of simultaneously discharging air, having been purified, in multiple directions, improving diversity in product design, and optimizing operational performance according to a type or a capacity of a filter.

BACKGROUND ART

An air purifier according to the related art has an air inlet in a housing forming an outer cover, and has an air purification filter and various functional filters in an internal space of the housing. In addition, after contaminated indoor air and dust are intaken through the air inlet, contaminants and dust in the air, having been intaken, are removed, so the air purifier allows indoor air to be purified.

The air purifier is configured to intake air through a blower provided inside a housing. The blower indicates a machine causing air flow, and may be used to denote an air purifier, an electric fan, or the like, in domestic applications and may be used to denote an air conditioning system, various intake and exhaust systems, and the like in industrial applications.

The blower described above may be classified as an axial flow type blower, a centrifugal type blower, a mixed flow type blower, and the like, according to characteristics of flow of air passing through an impeller. In detail, an air purifier having a centrifugal type blower, widely used in domestic applications, thereamong, may be divided into a single suction structure in which suction flow occurs on one side of a rotating shaft, and a double suction, structure in which suction flow occurs oil both sides of a rotating shaft.

The air purifier having a double suction structure has an air inlet on each of both sides of a housing, and has the advantage in which air intaken through the air inlet is purified and discharged in multiple directions, so an sir purification efficiency is high, as compared to a single suction structure.

A filter of the air purifier described above is generally disposed on each of both sides of a housing in consideration of air flow. In other words, as a filter is disposed on each of both sides of a housing to correspond to an air inlet installed on each of both sides of the housing, the overall design type of product is a cube type.

Therefore, it is difficult to apply various designs to an air purifier, so that a design of a product may be limited.

In addition, in order to allow for various product designs, a type or a capacity of a filter may be changed. Moreover, even when a design is fixed, a case in which a type or a capacity of a filter is changed may occur.

In this case, the air purifier may have different durability or air purification performance of a filter thereof, according to a type or a capacity of the filter, having been mounted.

However, an air purifier according to the related art is configured to be operated according to a control setting value fixed in manufacturing or in initial setting, so that it may be difficult to operate an air purifier while a performance thereof is optimized, according to a filter mounted on the air purifier.

DISCLOSURE

Technical Problem

An aspect of the present disclosure may provide an air purifier to which various designs are applied.

An aspect of the present disclosure may increase air purification efficiency by providing a flow path optimized in a housing.

An aspect of the present disclosure may optimize operational performance according to a type or a capacity of a filter mounted on an air purifier.

An aspect of the present disclosure may provide a shape variable type filter frame, allowing a multidirectional air discharge structure of an air purifier to be implemented using a plate-shaped filter according to the related art.

Technical Solution

According to an aspect of the present disclosure, an air purifier includes: a housing; a blowing unit installed in the housing to intake external air; and a filter unit having a plurality of filtering surfaces, through which the air passes and which are disposed in multiple directions, and an air inflow space, at least a part of which is surrounded by the filtering surfaces disposed in the multiple directions and into which the air discharged from the blowing unit flows.

In an exemplary embodiment, the filter unit may have a filter member, a body of which is bent or curved to allow the filtering surfaces to be disposed in multiple directions.

In another exemplary embodiment, the filter unit may include: a plurality of filter members; and a shape variable type filter frame on which the filter members are mounted, and which is deformed to allow the plurality of filter members to be disposed in multiple directions different from each other.

For example, the shape variable type filter frame may include: a first type frame on which the filter members are mounted; and a second type frame on which the filter members are mounted, and which is hinge-combined with one side of the first type frame to be rotated.

The air purifier according to an exemplary embodiment may further include: a filter recognition part for recognizing the filter unit; and a control part for setting a control setting value according to a recognition result by the filter recognition part, and controlling the blowing unit to perform an air purification operation according to the control setting value.

Advantageous Effects

According to an exemplary embodiment in the present disclosure, a height and a shape of a filter may be changed, so a form of an outer cover of an air purifier may be changed to correspond to the filter. Thus, a design of an air purifier may be variously implemented.

According to an exemplary embodiment in the present disclosure, as a height of a filter may be increased or a shape may be changed inside an air purifier, air purification efficiency may be significantly increased. Thus, using the same filter, an air purifier may be implemented to have various sizes.

According to an exemplary embodiment in the present disclosure, a frame supporting a filter may be deformed to have various forms, and thus, may be applied to various air suction structures and air discharge structures.

According to an exemplary embodiment in the present disclosure, the number of filters mounted on an air purifier, a type, or a capacity may be automatically recognized, and a control setting value of an air purifier may be set differently according to a recognition result, so a performance of an air purifier may be optimized.

DESCRIPTION OF DRAWINGS

FIG. 1 is a side cross-sectional view of an air purifier according to an exemplary embodiment;

FIG. 2 is a perspective view of a second housing cover of an air purifier according to an exemplary embodiment;

FIG. 3 is a cross-sectional view taken along line A-A' of FIG. 2;

FIG. 4 is a cross-sectional view taken along line B-B' of FIG. 2;

FIG. 5 is a combination state diagram of an air purifier according to an exemplary embodiment;

FIG. 6 is a perspective view of an air purifier according to another exemplary embodiment;

FIG. 7 is a side cross-sectional view of an air purifier according to another exemplary embodiment;

FIG. 8 is a perspective view of an air purifier according to another exemplary embodiment;

FIG. 9 is a perspective view of a filter holder included in an air purifier according to another exemplary embodiment;

FIG. 10 is a combination state diagram of an air purifier according to another exemplary embodiment;

FIG. 11 is a perspective view of a shape variable type filter frame according to an exemplary embodiment;

FIG. 12 is a bottom, view of the shape variable type filter frame illustrated in FIG. 11;

FIG. 13 is a perspective view illustrating a state in which the shape variable type filter frame illustrated in FIG. 11 forms a structure in the form of a double overlapped frame;

FIG. 14 is an exploded perspective view of the shape variable type filter frame illustrated in FIG. 11;

FIG. 15 is an operation state diagram illustrating a deformation operation of the shape variable type filter frame illustrated, in FIG. 11;

FIGS. 16 and 17 are perspective views illustrating an exemplary embodiment in which the shape variable type filter frame illustrated in FIG. 11 is applied to an air purifier having a multidirectional discharge structure;

FIGS. 18 and 19 are perspective views illustrating an exemplary embodiment in which the shape variable type filter frame illustrated in FIG. 11 is applied to an air purifier having a unidirectional discharge structure; and FIG. 20 is a diagram of an air purifier according to exemplary embodiments.

BEST MODE FOR INVENTION

In order to facilitate an understanding of the description of the exemplary embodiment of the present invention, the same reference numerals are used for the same elements in the accompanying drawings, and related elements among elements performing the same function in each exemplary embodiment are denoted by the same number or the number of extension.

Further, in order to clarify the gist of the present invention, a description of elements and techniques well known in the prior art will be omitted, and the present invention will be described in detail with reference to the accompanying drawings.

It is to be understood, however, that the spirit and scope of the present invention are not limited to the exemplary embodiments illustrated, but other forms may be suggested by those skilled in the art while specific components are added, changed, and deleted, which also included within the scope of the same idea as the present invention.

First, an air purifier according to the present invention may be configured to include a housing, a blowing unit installed in the housing to intake external air, and a filter unit installed in the housing and discharging air, having been purified, simultaneously in multiple directions.

Hereinafter, an air purifier according to the present invention will be described in detail.

First, in FIG. 1, an air purifier 100 according to a preferred exemplary embodiment is illustrated. The air purifier 100 according to the present invention may include a housing forming an outer cover. In this case, the housing may be provided to be divided into a first housing cover 111 and a second housing cover 112, and the first housing cover 111 and the second housing cover 112 may be combined to form a single housing.

As described above, the housing is provided as a divided type, so the housing is provided to be separated or combined. In this case, a variety of designs may be applied thereto, and internal components may be easily cleaned, convenience in use may be increased.

For example, the housing is provided to be divided, into the first housing cover ill and the second housing cover 112, a blowing unit 120 intaking external air is installed inside the first housing cover, and a filter unit 130 purifying air supplied from the blowing unit may be installed inside the second housing cover.

In this case, even when the first housing cover 111 and the blowing unit 120 installed inside the first housing cover are not changed, a height of the filter unit 130 installed inside the second housing cover 112 may only increase or decrease, so a design of an air purifier may be more easily changed.

In this case, when the blowing unit 120, intaking and discharging air, is provided in the same manner while a height of the filter unit 130 increases, purification capacity of an air purifier is improved, so an air purifier has the advantage in which the air purifier may be applied to a wider area.

In addition, as described later, when the filter unit 130 includes at least one bent portion, the filter unit 130 may be provided to have various shapes such as a circle, a rectangle, an ellipse, and the like, so a design of a second housing cover is also provided to be circular, rectangular, elliptical, and the like, corresponding to the shape of the filter unit 130. Thus, a variety of designs may be applied to an outer cover of an air purifier.

Meanwhile, in the first housing cover 111 forming a lower portion of a housing, an air inlet 111a in communication with an exterior for intaking air is provided in plural. Moreover, inside the first housing cover, a blowing fan 121, intaking and discharging air, is provided as the blowing unit 120.

In an exemplary embodiment, the air inlet 111a may be provided in each of both surfaces of the first, housing cover 111, and the blowing unit 120 may intake air on both surfaces of the first housing cover 111 through the air inlet 111a on each of both sides. As an example therefor, the blowing unit 120 may be provided as a single double suction centrifugal fan, but is not limited thereto. Alternatively, the blowing unit may be provided as two independent single suction centrifugal fans. In addition, a prefilter (not shown) for primarily filtering foreign materials included in air intaken through the air inlet 111a, in detail, a large foreign material, may be mounted in the first housing cover. By means of the prefilter configured, as described above, foreign materials may be prevented from being accumulated in an internal component such as the blowing unit 120, a motor (not shown), and the like provided inside an air purifier, the air purifier has the effect in which the service life of internal components may be extended.

In addition, as illustrated, in FIG. 1, when a filter member 131, which will be described later, is disposed in an upper portion of the blowing unit 120, a height of the filter member 131 may easily increase as needed, so the air purifier has the effect in which a performance of an air purifier may be increased.

Meanwhile, in the second housing cover 112 connected to am upper portion of the first housing cover 111, an air discharge part 113 in communication to an exterior for discharging air is provided in plural. Moreover, the filter member 131 is provided inside the first housing cover.

The filter member 131 may purify air discharged to the air discharge part 113 after flowing into a housing.

In the present invention, in the filter member 131, filtering surfaces 132a, 132b, 132c, and 132d, through which air passes, are disposed in multiple directions, and an air inflow space 132e, at least a portion of which is surrounded by the filtering surfaces 132a, 132b, 132c, and 132d disposed in multiple directions, may be provided.

The filter member 131 may be configured to have a closed cross-sectional structure in which both ends are connected to each other and four sides of the air inflow space 132e are surrounded by the filtering surfaces 132a, 132b, 132c, and 132d, and may be configured to have an open cross-sectional structure in which both ends are separated and a portion of the air inflow space 132e is only surrounded by the filtering surfaces.

In an exemplary embodiment, the filter member 131 may include a plurality of filtering surfaces 132a, 132b, 132c, and 132d, disposed in different directions, and thus may be configured in the form of a rectangular pipe as illustrated in FIG. 1, or in the form of a polygonal pipe. In addition, the filter member 131 may be configured in the form of a cylinder.

The filter member 131 according to the present invention may include a plurality of filtering surfaces 132a, 132b, 132c, and 132d, and may include the air inflow space 132e formed by the filtering surfaces 132a, 132b, 132c, and 132d. As an example, when the filter member 131 is provided in the polygonal form, the filter member may be formed of the plurality of filtering surfaces 132a, 132b, 132c, and 132d. In other words, a first filtering surface 132a, a second filtering surface 132b, a third filtering surface 132c, and a fourth filtering surface 132d may be included therein, and the air inflow space 132e formed by the filtering surfaces 132a, 132b, 132c, and 132d may be included therein. However, the filter member 131 may have not only a polygonal cross-section but also a circular cross-section as long as a closed cross-section is formed.

Here, the first filtering surface 132a, the second filtering surface 132b, the third filtering surface 132c, and the fourth filtering surface 132d may be provided by bending a single integrated filter, or may be provided by combining different filters. In addition, each of the filtering surfaces 132a, 132b, 132c, and 132d may be formed of different types of filter, and may be formed of the same type of filter, which may be suitably selected by those skilled in the art.

Meanwhile, air, supplied from the blowing fan 121, may flow in to the air inflow space 132e of the filter member 131, and the air, flowing in, may pass through the filter member 131 and may be supplied to an exterior through the air discharge part 113. In this case, the air discharge part 113 is provided in a surface corresponding to each of the filtering surfaces 132a, 132b, 132c, and 132d of the filter member 131, so air, filtered by the filter member 131, is allowed to be supplied to an exterior.

Meanwhile, according to a preferred exemplary embodiment, the second housing cover 112, covering an upper portion of the first housing cover 111, may be provided as illustrated in FIG. 2. In other words, in an internal surface of the second housing cover 112, a flow path switching member 114, protruding into the air inflow space 132e and guiding air flowing into the air inflow space 132e to the filtering surfaces 132a, 132b, 132c, and 132d, is provided.

The flow path switching member 114 may be fixed to the second housing cover 112 through various combining members 114a such as a pin, a bolt, and the like, and flow of air, having been purified, is induced by the flow path switching member 114 to the air discharge part 113, so air may smoothly flow and air, having been purified, may be easily discharged.

In FIGS. 3 and 4, a longitudinal section and a transverse section of the second housing cover 112 are illustrated. Referring to this, the flow path switching member 114 has a cross section narrowing downwardly, and an edge is curved to be concave inwardly of the second housing cover 112.

The flow path switching member 114 formed as described above may be disposed in the air inflow space 132e of the filter member 131 as illustrated in FIG. 5, which is possible by combining the second housing cover 112 with an upper portion of the first housing cover 111.

Moreover, the air discharge part 113 corresponding to each of four filtering surfaces 132a, 132b, 132c, and 132d of the filter member 131 may be formed in a side surface of the second housing cover 112. In this case, each air discharge part 113 may be formed in a surface opposing each of the filtering surfaces 132a, 132b, 132c, and 132d of the filter member 131.

Here, when the flow path switching member 114 is combined with an upper portion of the filter member 131, a flow path of air may be switched, and air may smoothly flow. Thus, air may be smoothly discharged through four air discharge parts, formed in a side surface of the second housing cover 112.

Meanwhile, in FIG. 6, an air purifier 100 according to another exemplary embodiment is illustrated.

The air purifier 100 according to another exemplary embodiment may include a first housing cover 111 having a blowing fan 121 therein, and a second housing cover 112 combined with an upper portion of the first housing cover. Moreover, an outer cover of the air purifier may be formed by the first housing cover and the second housing cover.

In this case, the air discharge part 116 provided in the second housing cover 112 is formed along an edge 115 of the second housing cover 112. Referring to FIG. 7, to illustrate this in more detail, in a first filtering surface 132a and a third filtering surface 132c of the filter member 131, or in an upper portion of at least one among a first filtering surface 132a, a second filtering surface 132b, a third filtering surface 132c, and a fourth filtering surface 132d, a closing cover is installed therein.

The closing cover according to a preferred exemplary embodiment may include a support frame 141, and a plurality of partition walls 142 installed in the support frame 141. Thus, the support frame 141, closing an upper portion of the air inflow space 132e of the filter member 131, may be installed in an upper portion of the filtering surfaces 132a, 132b, 132c, and 132d of at least one of filter members 131.

Moreover, the plurality of partition walls 142 are combined with an upper portion of the support frame 141, and the partition walls may be extended toward an internal surface of the second housing cover 112. In this case, an upper portion of the air inflow space 132e of the filter member 131 is closed by the support frame 141, and a hollow portion 143 formed by means of the partition wall 142 may be provided in an upper portion of the support frame 141.

Moreover, the second housing cover 112 is provided while surfaces corresponding to the air inflow space 132e and the hollow portion 143 are closed. In addition, an edge portion thereof is open and is provided as the air discharge part 116. Thus, air passing through the filter member 131 and being purified is discharged through the air discharge part 116 formed in the edge portion of the second housing cover 112, and the air discharge part 116 is formed in each of four edges of the second housing cover 112. Thus, air, having been purified, is able to be discharged in four directions, so the air purification time may be shortened.

Meanwhile, in FIG. 8, an air purifier 100 according to another exemplary embodiment is illustrated therein. According to this, an air discharge part 113 discharging air having been purified is formed in four side surfaces of a second housing cover 112, and an upper air discharge part 117 discharging air having been purified is formed in an upper surface of the second housing cover 112.

In this case, the upper air discharge part 117 is formed in the upper surface of the second housing cover 112, and may be formed in a region corresponding to the air inflow space 132e of the filter member 131, described previously. In other words, an upper filter member 152 (for example, a HEPA filter) to be described later may be provided in an upper portion of the air inflow space 132e of the filter member 131.

To this end, a filter holder 150 illustrated in FIG. 9 may be provided. The filter holder 150 has the form of a frame, and a through part 151 corresponding to the air inflow space 132e of the filter member 131 may be provided in the center thereof.

In FIG. 10, a combination state of the filter holder 150 is illustrated therein. The filter holder 150 is installed in an upper portion of the filter member 131, and the through part 151 of the filter holder 150 is allowed to oppose the air inflow space 132e of the filter member 131.

Moreover, the upper filter member 152 may be inserted into the through part 151 of the filter holder 150. In this case, preferably, the upper filter member 152 may be a HEPA filter, but is not limited by the present invention.

As described above, when the upper filter member 152 is included, air is able to be discharged to an upper portion in addition to the air discharge part 113 formed in a side surface of the second housing cover 112, so air purification efficiency may be further increased.

Meanwhile, in FIGS. 11 through 19, a shape variable type filter frame 200 according to an exemplary embodiment is illustrated therein.

In the shape variable type filter frame 200 according to an exemplary embodiment, a plate-shaped filter according to the related art is used, so a multidirectional air discharge structure of the air purifier 100, described previously referring to FIGS. 1 through 10, may be implemented.

In other words, in the shape variable type filter frame 200, according to art exemplary embodiment, a plurality of plate-shaped filters are used, so filtering surfaces are disposed in multiple directions, and a filter unit having an air inflow space, at least a portion of which is surrounded, by the filtering surfaces disposed in multiple directions, may be implemented.

Hereinafter, referring to FIGS. 11 through 19, the shape variable type filter frame 200 according to an exemplary embodiment will be described.

As illustrated in FIGS. 11 through 13, the shape variable type filter frame 200 according to an exemplary embodiment is a structure on which a plurality of filter members 231 are mounted, and each of the plurality of filter members 231, having been deformed, may be disposed in multiple directions different from each other.

In other words, in the shape variable type filter frame 200 according to an exemplary embodiment illustrated in FIGS. 11 through 19, while the filter member 231 itself is not bent or curved, the plate-shaped filter member 231 according to the related art is used as the filter member 231 and the shape variable type filter frame 200 on which the filter member 231 is mounted is deformed. As a result, a structure in which filtering surfaces are disposed in multiple directions may be implemented.

In order to implement the form described above, a plurality of plate-shaped filter members 231 may be mounted on the shape variable type filter frame 200. In addition, the shape variable type filter frame 200 is deformed, so the plurality of plate-shaped filter members 231 may foe disposed while forming a predetermined angle with respect to each other.

Here, the plurality of filter members 231 mounted on the shape variable type filter frame 200 may be the same type of filter, or may be a different types of filter performing different functions.

For example, as the filter member 231, various types of filters, such as a prefilter, a functional filter, a High Efficiency Particulate Air (HEPA) filter, a deodorizing filter, and the like may be employed.

Here, the prefilter is provided for removing relatively large dust, hair, pet hair, and the like, the functional filter is provided for antibacterial properties and for removing pollen, house dust mites, germs, bacteria, and the like, the HEPA filter is provided for removing fine dust, various organisms such as indoor mold, spores, and the deodorizing filter is provided for removing indoor odors and harmful gas.

Further, the filter member 231 mounted on the shape variable type filter frame 200 is not limited to an air purification filter, and may be provided as a humidification filter or a dehumidification filter depending on usage.

Meanwhile, as a specific example for implementing a deferrable configuration as described previously, the shape variable type filter frame 200 may include a first type frame 210 and a second type frame 220, and the first type frame 210 and the second type frame 220 may be folded to form various types of frame structures.

The first type frame 210 may be configured in the form of a frame to allow an edge of the filter member 231 to be mounted thereon.

In an exemplary embodiment, a regular position guide part 212 may be provided on an upper end of the first type frame 210.

For example, the regular position guide part 212 may be configured in the form of a protrusion protruding from the upper end of the first type frame 210 as illustrated in FIG. 11, and a fastening groove 213 in which the regular position guide part 212 in the form of a protrusion is to be inserted and fastened may be provided in a lower end of the first type frame 210 as illustrated in FIG. 12, but is not limited thereto. Alternatively, the regular position guide part 212 may be configured in the form of a rib or a hook, supporting an outer portion of the first type frame 210 stacked on an upper end thereof.

In addition, in an exemplary embodiment, a filter separation prevention rib 215 protruding along an inner edge may be provided inside the first type frame 210. The filter separation prevention rib 215 may serve as a stopper for holding a position of the filter member 231 mounted on the first type frame 210.

The second type frame 220 may also be configured in the form of a frame to allow an edge of the filter member 231 to be mounted thereron, in the same manner as the first type frame 210.

In addition, the second type frame 220 may be hinge-combined with one side of the first type frame 210 to be rotated. In an exemplary embodiment, the second type frame 220 may be hinge-combined with the first type frame 210 to be rotated backwards and forwards of the first type frame 210.

The second type frame 220 may rotate with respect to the first type frame 210 and may form a structure bent at various angles. For example, when the second, type frame 220 is disposed at 90 degrees with respect to the first type frame 210, an L-shaped structure may be formed with the first type frame 210. Moreover, when the second type frame is disposed at 0 degree or 180 degrees with respect to the first type frame 210, a plate-shaped structure, overlapped or arranged in a row, may be formed.

In addition, in an exemplary embodiment, in the second type frame 220, in the same manner as the first type frame 210, a regular position guide part 222, a filter separation prevention rib 225, and a fastening groove 223 may be included therein.

Meanwhile, in an exemplary embodiment, the shape variable type filter frame 200 may be configured to include a plurality of first type frames 210 and a plurality the second type frames 220. Moreover, as the first type frame 210 and the second type frame 220 are alternately connected to each other, according to a rotation angle of each of the first type frame 210 and the second type frame 220, a structure in the form of a polygonal ring or a structure in the form of a double overlapped, frame may be configured.

For reference, the structure in the form of a polygonal ring indicates a structure in which the first type frame 210 and the second type frame 220 are separated from each other and the air inflow space 132e is formed in the center as illustrated in FIG. 11, and the structure in the form of a double overlapped frame indicates a structure in which portions of the first type frame 210 and the second type frame 220 overlap each other and the entirety thereof forms a plate-shape as illustrated in FIG. 13.

Here, when the first type frame 210 and the second type frame 220 form the structure in the form of a double overlapped frame, the plurality of filter members 231 may be disposed in the same direction.

Hereinafter, as illustrated in FIGS. 11 through 15, shape variable type filter frames 210 and 220, including two first type frames 210 and two second type frames 220, will be described in detail.

In an exemplary embodiment, the two first type frames 210 and the two second type frames 220 may be alternately connected to each other and may form a rectangular ring shaped structure.

Here, the two first type frames 210 and the two second type frames 220 may be rotationally symmetrically arranged with respect to the center of the rectangular ring shaped structure formed thereby.

In addition, the filter frames 210 and 220 may form a structure in the form of a double overlapped frame, as the second type frame 220 combined with one side of the first type frame 210 is disposed at 180 degrees and the second type frame 220 combined with the other side of the first type frame 210 is disposed at 0 degree as illustrated in FIG. 13.

To this end, in an exemplary embodiment, the second type frame 220 combined with one side of the first type frame 210 is configured to rotate within a range of a rotation angle of 90 degrees to 180 degrees with respect to the first type frame 210.

In addition, the second type frame 220 combined with the other side of the first type frame 210 is configured to rotate within a range of a rotation angle of 0 degree to 90 degrees with respect to the first type frame 210.

In an exemplary embodiment, the first type frame 210 and the second type frame 220 may have outer hinge-combining parts 217 and 227 in one side, and may have inner hinge-combining parts 218 and 228 in the other side.

Here, the outer hinge-combining part 217 of the first type frame 210 may be combined with the outer hinge-combining part 227 of the second type frame 220, and the inner hinge-combining part 218 of the first type frame may be combined with the inner hinge-combining part 228 of the second type frame 220.

In addition, the outer hinge-combining parts 217 and 227 are located outside a connection portion of the first type frame 210 and the second type frame 220, and the inner hinge-combining parts 218 and 228 are located inside a connection portion of the first type frame 210 and the second type frame 220, as illustrated in FIG. 12.

The outer hinge-combining parts 217 and 227 may allow the first type frame 210 and the second type frame 220 to be hinge-combined so as to be rotated at an angle at which the first type frame 210 and the second type frame 220 are allowed to overlap each other.

In addition, the inner hinge-combining parts 218 and 228 may allow the first type frame 210 and the second type frame 220 to be hinge-combined so as to be rotated at an angle at which the first type frame 210 and the second type frame 220 are allowed to be arranged in a row.

In this regard, two first type frames 210 and two second type frames 220 are rotated with respect to an adjacent frame and form a structure in the form of a double overlapped frame as illustrated in FIG. 15.

Meanwhile, in an exemplary embodiment, a first sealing part 219 protruding from each of both sides of the first type frame 210 may be provided therein.

In addition, a second sealing part 229 to be in airtight contact with the first sealing part 219 may be provided on each of both sides of the second type frame 220.

The first sealing part 219 and the second sealing part 229 are in contact with each other when the first type frame 210 and the second type frame 220 are disposed to form a predetermined angle, and thus may allow a connection portion of the first type frame 210 and the second type frame 220 to be sealed so as to prevent air from being leaked out from the connection portion of the first type frame 210 and the second type frame 220.

In addition, the first sealing part 219 and the second sealing part 229 may perform a function of a stopper limiting a rotation angle between the first type frame 210 and the second type frame 220, in addition to a function of sealing the connection portion of the first type frame 210 and the second type frame 220 as described previously.

Moreover, the first sealing part 219 and the second sealing part 229 may perform a function of resisting air flow to maintain the form of a polygonal ring when air is discharged from an inside to an outside of the filter frames 210 and 220 forming the form of a polygonal ring. In other words, when the first type frame 210 and the second type frame 220 receive wind pressure from the inside to the outside, the first sealing part 219 and the second sealing part 229 are in contact with each other and may resist wind pressure.

In an exemplary embodiment, the first sealing part 219 and the second sealing part 229 may be in airtight contact with each other when a plurality of first type frames 210 and a plurality of second type frames 220 configure the form of a polygonal ring.

For example, the first sealing part 219 may be configured in the form of a plate extended to be inclined on each of both sides of the first type frame 210, and the second sealing part 229 may be configured in the form of a plate extended to be inclined on each of both sides of the second type frame 220 to correspond to the first sealing part 219. In this case, when the first sealing part 219 and the second sealing part 229 are in surface contact with each other to secure airtightness when the first type frame 210 and the second type frame 220 rotate and are disposed at a predetermined angle.

However, the first sealing part 219 and the second sealing part 229 are not limited to a structure securing airtightness by means of surface contact, and may be configured to have any structure capable of preventing air from being leaked out from the connection portion of the first type frame 210 and the second type frame 220.

Meanwhile, in FIGS. 16 through 19, an exemplary embodiment in which the shape variable type filter frame 200 is applied to an air purifier is illustrated therein.

First, in FIGS. 16 and 17, an exemplary embodiment in which the shape variable type filter frame 200 is applied to the air purifier 100 having a multidirectional discharge structure according to an exemplary embodiment is illustrated therein.

As illustrated in FIGS. 16 and 17, in the air purifier 100 having a multidirectional discharge structure, an air inlet 111*a* is provided in one side of a first housing cover 111, and an air discharge part 113 is provided in four sides of the second housing cover 112.

When the shape variable type filter frame 200 is applied to the air purifier 100 having a multidirectional discharge structure, the shape variable type filter frame 200 may be mounted in the form of a polygonal ring to correspond to the air discharge part 113 provided in four sides as illustrated in FIGS. 16 and 17. In this case, air, flowing into the second housing cover 112 inside the first housing cover 111, flows inside the shape variable type filter frame 200, passes through the filter member 231 mounted on each of the first type frame 210 and the second type frame 220, and is then discharged indoors through the air discharge part 113.

Meanwhile, in FIGS. 18 and 19, an exemplary embodiment in which the shape variable type filter frame 200 is applied to an air purifier having a unidirectional discharge structure is illustrated therein.

As illustrated in FIGS. 18 and 19, in an air purifier having a unidirectional discharge structure, an air inlet 111*a* is provided in one side of a first housing cover 111, and a single air discharge part 113 is provided in an upper end or the other side of the first housing cover 111.

When the shape variable type filter frame 200 is applied to an air purifier having a unidirectional discharge structure, the shape variable type filter frame 200 may be mounted in the form of a double overlapped frame to correspond to the air inlet 111*a* as illustrated in FIGS. 18 and 19. In this case, air, intaken through the air inlet 111*a*, passes through the filter member 231 mounted on each of the first type frame 210 and the second type frame 220, and is then discharged through the air discharge part 113.

In addition, in a structure in which the shape variable type filter frame 200 configures the form of a double overlapped frame, filter members 231 mounted on the first type frame 210 and the second type frame 220 have a double overlapped form, so air may be filtered in two stages.

The shape variable type filter frame 200 according to an exemplary embodiment, as described previously may be deformed in various shapes, and thus has the advantage in which the shape variable type filter frame may be flexibly applied to various air intaking structures and air discharging structures of an air purifier.

In addition, the shape variable type filter frame 200 has a reduced volume by means of deformation, and thus has the advantage in which the shape variable type filter frame may foe easily transported and stored.

Next, referring to FIG. 20, a filter specification automatic recognition function of the air purifier 100 according to exemplary embodiments and an automatic operation control function according to a filter specification will be described.

Referring to FIG. 20, the air purifier 100 according to exemplary embodiments may include a filter recognition part 160, a control part 170, a storage part 180, and a display part 190.

The filter recognition part 160 is provided to recognize a type or a capacity of filter members 131 and 231, forming filter units 130 and 200.

For example, in the filter members 131 and 231, an identification part (for example, an identification tag, a unique protrusion, a predetermined color, or the like), capable of identifying a type thereof is provided therein, and the filter recognition part 160 may identify a type of the filter members 131 and 231 using a means (for example, a tag recognition means, a protrusion sensing means, a color recognition means, or the like) for recognizing the identification part provided in the filter members 131 and 231.

For another example, the filter recognition part 160 may recognize the number, an area, a height, a depth, and the like of the filter members 131 and 231 are recognized through various sensors (for example, a magnetic sensor, or the like), so a capacity of the filter members 131 and 231 may be identified.

Here, the number of the filter members 131 and 231 indicates the number of the filter units 130 and 200 staked, when a plurality of filter units 130 and 200, described previously with reference to FIGS. 1 through 13 are staked in a height direction of the air purifier 100 and installed.

Additionally, the filter recognition part 160 may recognize that the filter members 131 and 231 are not properly mounted on the air purifier 100 when a type or a capacity of the filter members 131 and 231 is not identified, as described previously.

The control part 170 is provided for controlling an operation of the air purifier 100, and may be implemented as a processor, for example, a central processing unit (CPU), a graphics processing unit (GPU), a microprocessor, an application specific integrated, circuit (ASIC), a field programmable gate array (FPGA), and the like.

In detail, the control part 170 may differently set a control setting value for an operation of the air purifier 100 depending on a type or a capacity of the filter members 131 and 231, recognized by the filter recognition part 160, when the filter members 131 and 231 are mounted on the air purifier 100. Here, the control setting value for an operation of the air purifier 100 may include a rotation speed default value of a motor of the blowing unit 120 (for example, a rotation speed setting value for each blowing step, a minimum or maximum rotation speed setting value, and the like), a reference value for replacement cycle determination of a filter (for example, the use time, a flow rate, and the like), and the like.

In addition, the control part 170 may be controlled to operate a purification function of the air purifier 100, a filter replacement cycle determination and alarm function, and the like, according to the control setting value differently set depending on a type or a capacity of the filter members 131 and 231. The functions of the air purifier 100 described above are well known to those skilled in the art, so a detailed description thereof will be omitted.

The storage part 180 is provided for storing information necessary for control setting of the air purifier 100, and may be provided as, for example, a nonvolatile memory (for example, a read-only memory (ROM), a flash memory, and the like).

For example, the storage part 180 may set information on a control setting value differently set, depending on a type or a capacity of the filter members 131 and 231.

The display part 190 may be provided for displaying operation-related information of the air purifier 100 according to control of the control part 170 and providing the operation-related information to a user, and may be provided as, for example, an LED panel, a touchscreen, and the like.

For example, the display part 190 may display information on the type or the capacity of the filter members 131 and 231, recognized by the filter recognition part 160.

For another example, the display part 190 may provide a user with filter abnormally mounted alarm information through a display when a filter, having not been properly mounted, is recognized by the filter recognition part 160.

The air purifier 100 capable of recognizing a filter specification as described above may automatically recognize a type or a capacity of the filter members 131 and 231, having been installed, and may differently set a control setting value of the air purifier 100 according to a recognition result, so a performance of the air purifier 100 may be optimized.

In addition, the air purifier 100 does not require a separate operation or a manual setting for control setting of the air purifier 100, and thus may be more conveniently used.

While the present, disclosure has been shown and described with reference to exemplary embodiments thereof in particular, the present disclosure is not limited thereto. It will be readily apparent to those skilled in the art that various changes and modifications thereof may be made within the spirit and scope of the present disclosure, and therefore to be understood that such changes and modifications belong to the scope of the appended claims.

The invention claimed is:

1. An air purifier, comprising:
a housing;
a blowing unit installed in the housing to intake external air; and
a filter unit including a filter member having four filtering surfaces, through which flowing air caused by the blowing unit passes and which are disposed in multiple directions, and a filter frame on which the filter member is mounted,
wherein the filter frame includes:
a first frame;
a second frame of which one side is rotatably connected to one side of the first frame;
a third frame of which one side is rotatably connected to other side of the first frame; and
a fourth frame of which one side is rotatably connected to other side of the second frame, and of which other side is rotatably connected to other side of the third frame,
wherein when an angle between the first frame and the second frame increases and an angle between the third frame and the fourth frame increases, an angle between the first frame and third frame decreases and an angle between the second frame and the fourth frame decreases, and
wherein when the angle between the first frame and the second frame decreases and the angle between the third frame and the fourth frame decreases, the angle between the first frame and third frame increases and the angle between the second frame and the fourth frame increases.

2. The air purifier of claim 1, wherein when the second frame rotates between an upper limit and a lower limit of a first range of a rotation angle with respect to the first frame, the third frame rotates between an upper limit and a lower limit of a second range of a rotation angle with respect to the first frame,
wherein when the second frame rotates between the upper limit and the lower limit of the second range of a rotation angle with respect to the fourth frame, the third frame rotates between the upper limit and the lower limit of the first range of a rotation angle with respect to the fourth frame,
wherein the lower limit of the first range is 0 degree, the upper limit of the first range is 90 degrees, the lower limit of the second range is 90 degrees, and the upper limit of the second range is 180 degrees.

3. The air purifier of claim 1, wherein when the angle between the first frame and the second frame is 0 degree and the angle between the first frame and the third frame is 180 degrees, the first frame and the second frame are in contact with each other and the third frame and the fourth frame are in contact with each other.

4. The air purifier of claim 1, wherein when the angle between the first frame and the second frame is 90 degrees and the angle between the first frame and the third frame is 90 degrees, the filter frame forms a rectangle.

5. The air purifier of claim 1, wherein the first frame and the fourth frame are parallel to each other and the second frame and the third frame are parallel to each other.

6. The air purifier of claim 1, wherein the angle between the first frame and the second frame is the same as the angle between the third frame and the fourth frame and the angle between the first frame and the third frame is the same as the angle between the second frame and the fourth frame.

7. The air purifier of claim 1, wherein the sum of the angle between the first frame and the second frame and the angle between the first frame and the third frame is 180 degrees.

8. The air purifier of claim 1, wherein the first frame and the fourth frame are a first type frame and the second frame and the third frame are a second type frame.

9. The air purifier of claim 1, wherein the filter member includes:
   a first filter member mounted on the first frame,
   a second filter member mounted on the second frame,
   a third filter member mounted on the third frame, and
   a fourth filter member mounted on the fourth frame.

10. The air purifier of claim 9, wherein each of the first frame, the second frame, the third frame, and the fourth frame is configured in the form of a frame surrounding each of the first filter member, the second filter member, the third filter member, and the fourth filter member.

* * * * *